May 31, 1932.   A. A. SMALLWOOD   1,860,907
FREIGHT CAR HAND BRAKE ATTACHMENT
Filed Nov. 26, 1929
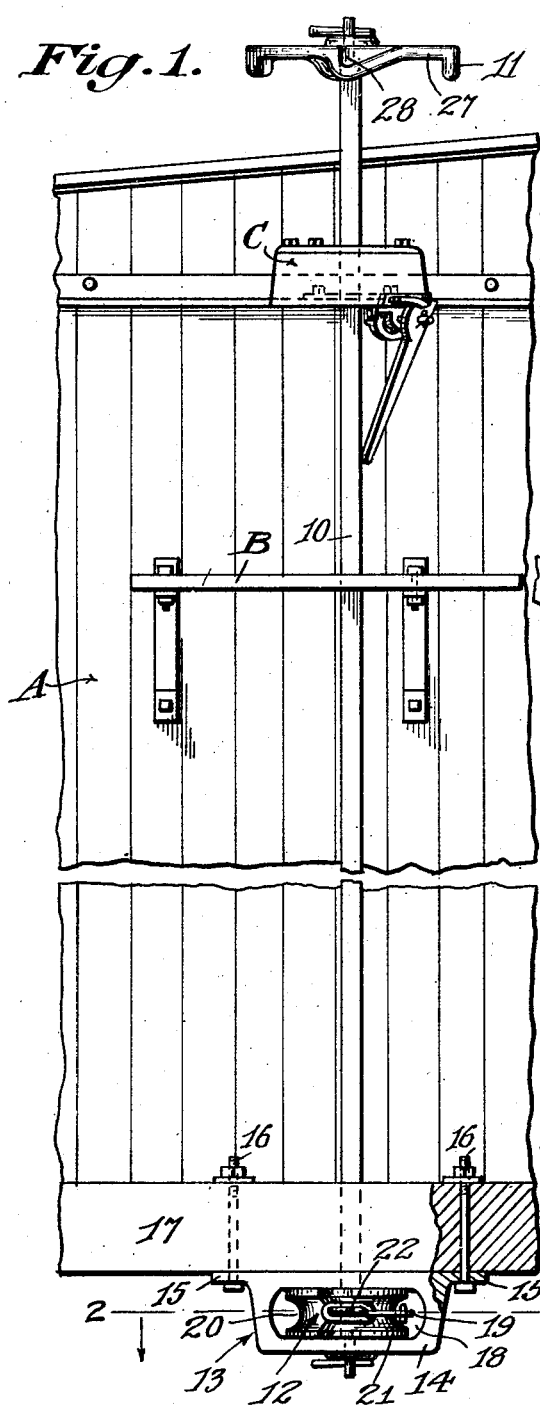
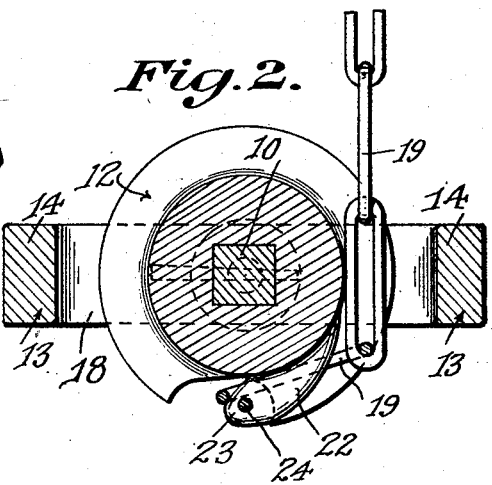
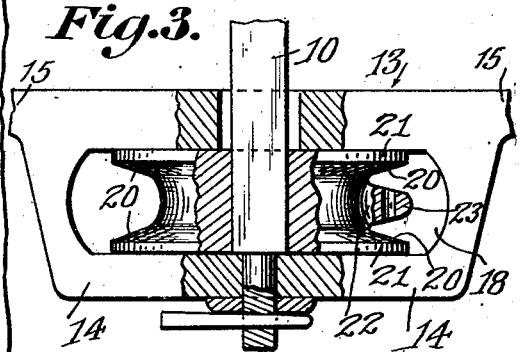
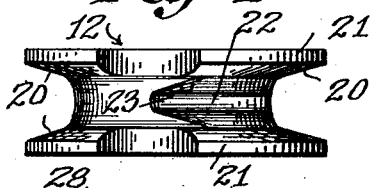
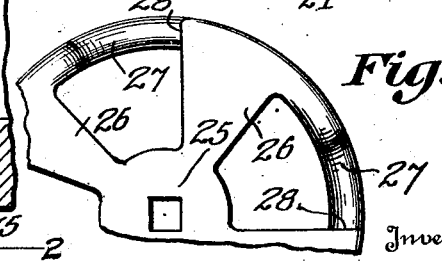
Inventor
Albert A. Smallwood, Patented May 31, 1932

1,860,907

UNITED STATES PATENT OFFICE

ALBERT A. SMALLWOOD, OF MARTINSBURG, WEST VIRGINIA

FREIGHT CAR HAND BRAKE ATTACHMENT

Application filed November 26, 1929. Serial No. 409,844.

The invention relates to freight car hand brakes, and more especially to the brake chain pulley and its bracket.

The primary object of the invention is the provision of a brake chain pulley, wherein the construction thereof is novel in form so as to permit the attachment of any one of the links of a brake chain therewith, which link will be firmly and detachably secured to the pulley, the latter being held in a bracket which assures the true winding of the chain on said pulley.

Another object of the invention is the provision of a hand wheel for the brake mechanism, wherein the construction is novel in form so that when leverage in manipulating said wheel is desired, a bar can be applied to the wheel and become seated therein to enable the required leverage to be applied to the wheel for the application of the brakes or the release of the same.

A further object of the invention is the provision of a pulley and bracket therefor, wherein the chain for applying the brakes cannot possibly slip on the pulley or cause the jamming of the pulley during the working of the brakes, the bracket for said pulley being of novel form.

A still further object of the invention is the provision of parts of a brake mechanism, wherein the construction thereof is novel in form to assure the perfect working of the brakes under all conditions and positiveness of operation.

A still further object of the invention is the provision of improvement in brake mechanism which is extremely simple in construction, thoroughly reliable and efficient in purpose, strong, durable, readily and easily operated, and inexpensive to manufacture and install.

With the above and other objects in view the invention consists in the features of construction, combination and arrangement of parts as will be hereinafter more fully described, illustrated in the accompanying drawings, showing the preferred embodiment of said invention, and pointed out in the claims hereunto appended.

In the accompanying drawings:—

Figure 1 is a fragmentary end elevation of a freight car, showing the brake operating mechanism mounted thereon with the hand wheel, pulley and bracket for the latter constructed in accordance with the invention.

Figure 2 is a sectional detail view on the line 2—2 of Figure 1.

Figure 3 is a fragmentary elevation of the bracket and pulley, both being partly broken away.

Figure 4 is a detail elevation of the pulley.

Figure 5 is a fragmentary plan view of the hand wheel detached from the shaft.

Similar reference characters indicate corresponding parts throughout the several views in the drawings.

Referring to the drawings in detail A designates a portion of the end of a freight car body which is of the conventional construction and B the brake staff step of usual form while 10 is the brake staff. The upper end of the staff extends above the roof of the car body A and carries a hand wheel 11 and the lower end of this staff has fixed thereto the brake chain pulley 12 arranged in a bracket 13 the locking and releasing mechanism for the staff being generally indicated at C, which latter constitutes the subject matter of a separate application for Letters Patent filed this 26th day of November, 1929 bearing Serial No. 409,843.

The bracket 13 is in the form of an unbroken loop-like frame 14 having lateral ears 15 at its top, and through these ears are passed bolts 16 which engage in the base sill 17 of the car body A as shown in Figure 1 of the drawings and in this manner said bracket is firmly secured in position the lower end of the staff 10 being passed centrally through the said bracket as will be apparent.

Arranged within the bracket 13 is the pulley 12 the opening 18 in the bracket for the pulley being substantially the width of said pulley so as to prevent the brake chain 19 from running off of the pulley during the application or release of the brakes. This pulley 12 is formed with a peripheral groove 20 to provide edge flanges 21 on opposite sides thereof while protruding into the groove 20 is a curved hook 22 formed with an outwardly tapered bill or nose 23 over which is engaged any one of the links of the chain 19 for the securing of the latter to the pulley. Engaged in the bill or nose 23 is a fastener 24 which holds the link attached, the edges of the flanges 21 being cut away in alignment with the nose 23 to permit the fastener 24 to be engaged in and disengaged from said nose.

The hand wheel 11 is formed with a center hub 25 having the radial spokes 26 merging into a circular hand grip 27 the latter adjacent to the respective spokes being provided with notches or depressions forming seats or sockets 28 for receiving a suitable bar (not shown) used for effecting leverage on the hand wheel 11 when required. The inner end of this bar is adapted to have its bearing against the staff 10 when applied to the wheel and will assure easy turning of the hand wheel in the application of the brakes.

From the foregoing it is thought that the construction and manner of use of the parts constituting the present invention will be clearly understood, and therefore a more extended explanation has been omitted.

What is claimed is:—

1. In a car hand brake of the kind described, a brake chain pulley formed with a peripheral groove and edge flanges, the latter having registering notches, a curved hook protruding from the groove at the notches to confront the median of said groove and having a bill for the engagement of the link of a brake chain thereover, and a bearing bracket snugly embracing the pulley.

2. In a car hand brake, a brake chain pulley having a peripheral groove, a curved hook extending from the groove and having an outwardly tapered bill confronting the groove for the detachable engagement thereover of the link of a brake chain, a supporting bracket closely embracing the pulley and a fastener removably inserted in the bill to retain the link thereon.

In testimony whereof I affix my signature.

ALBERT A. SMALLWOOD.